United States Patent
Yuyama

(10) Patent No.: US 6,444,728 B1
(45) Date of Patent: Sep. 3, 2002

(54) MODELING LIGHTWEIGHT DOUGH

(75) Inventor: Noritada Yuyama, Gotenba (JP)

(73) Assignee: Padico Co., Ltd., Tokyo (JP)

( * ) Notice: Subject to any disclaimer, the term of this patent is extended or adjusted under 35 U.S.C. 154(b) by 0 days.

(21) Appl. No.: 09/704,605

(22) Filed: Nov. 3, 2000

(30) Foreign Application Priority Data

Nov. 8, 1999 (JP) .......................................... 11-352139

(51) Int. Cl.7 ............................ C08J 9/32; C08L 29/04
(52) U.S. Cl. ...................... 523/218; 524/503; 524/803; 524/378
(58) Field of Search .......................... 523/218; 524/503, 524/803

(56) References Cited

U.S. PATENT DOCUMENTS

| | | | |
|---|---|---|---|
| 5,157,063 A | * | 10/1992 | Wetherell |
| 5,171,766 A | * | 12/1992 | Mariano et al. |
| 5,498,645 A | * | 3/1996 | Mariano et al. |
| 5,506,280 A | * | 4/1996 | Miller et al. |

* cited by examiner

*Primary Examiner*—Tae H. Yoon
(74) *Attorney, Agent, or Firm*—Oblon, Spivak, McClelland, Maier & Neustadt, P.C.

(57) ABSTRACT

The invention provides modeling lightweight dough comprising synthetic resin hollow microspheres having a particle diameter of 20 to 120 μm, polyvinyl alcohol, vinyl acetate resin, and water. The dough of the present invention is excellent in lightweight, formability, shape preservation of the modeled shape, and bending deformation resistance of the modeled product obtained by modeling and drying. The modeled product is long lasting.

12 Claims, No Drawings

MODELING LIGHTWEIGHT DOUGH

BACKGROUND OF THE INVENTION

1. Field of the Invention

This invention relates to modeling lightweight dough for hand crafting used by a worker, such as children and artist.

2. Description of the Prior Art

Heretofore, dough has been used for hand crafting. Generally, dough is plastic so as to be used for forming, can be deformed into a desired shape by hands to form a craft, dried naturally to harden it, and the shape of the craft can be maintained for a long time. Inorganic heavyweight clay has been used previously as the main component of the dough; however, currently lightweight dough has been used widely instead of heavyweight clay because of easy modeling and easy carrying. Lightweight dough that contains, for example, lightweight hollow microspheres as the major component in volume, and binder, fiber powder, and water as the minor component in volume has been known.

An example of lightweight dough containing hollow microspheres, polyvinyl alcohol, polyvinyl alcohol gelling agent, and water has been proposed in U.S. Pat. No. 5,506,280 to realize the lightweight dough.

However, the above-mentioned lightweight dough is not sufficient in formability or workability. In detail, it is necessary for the dough to be rendered non-sticky to hand, easily deformable, stably ductile for forming to a fine shape, smooth on the surface of the stretched shape, and long shape preservation of the modeled product. However, the conventional lightweight dough does not sufficiently satisfy the above-mentioned requirements. In detail, the conventional lightweight dough is still sticky to hand, hard to deform easily, too elastic to stretch dough to obtain a desired shape even though it is deformed, not sufficiently smooth on the stretched surface, or insufficient in shape preservation after modeling. Furthermore, a modeled product made of the conventional dough becomes brittle after modeling and drying, and is poor in deformation resistance, that causes the breaking of the model product when the external force is exerted. The conventional dough is disadvantageous as described hereinabove, the craft modeled by use of the conventional dough cannot be maintained stably, and the long time preservation is difficult due to weakness to the external force.

BRIEF SUMMARY OF THE INVENTION

It is an object of the present invention to provide modeling dough that is lightweight so that children can lift and carry it easily for modeling and can carry the modeled craft easily.

It is another object of the present invention to provide modeling dough that gives comfortable hand feeling to a worker during modeling, is suitably ductile so that it is easily deformable to a desired shape by use of a force of the hand during modeling, is smooth on the deformed surface, and is suitably hard so that the modeled shape is maintained and excellent in shape preservation.

It is still another object of the present invention to provide modeling dough that is not sticky to the hand of a worker during modeling, excellent in releasability, stain-resistant on hand and clothes of a worker, and enables comfortable modeling work.

It is a further object of the present invention to provide modeling dough that forms a modeled product obtained by modeling and drying of the dough of the present invention excellent in resistance to bending deformation and a model product excellent in long preservation.

DESCRIPTION OF THE PREFERRED EMBODIMENTS

The present invention provides a modeling dough comprising synthetic resin hollow microspheres having a particle diameter of 20 to 120 $\mu$m, polyvinyl alcohol, vinyl acetate resin, and water, and a modeling dough comprising synthetic resin hollow microspheres having a particle diameter of 20 to 120 $\mu$m, polyvinyl alcohol, vinyl acetate resin, polyethylene oxide, and water.

The synthetic resin hollow microspheres used in the present invention are hollow microspheres formed by heating synthetic resin heat-expandable minute spheres containing low-boiling point hydrocarbon or the like. The synthetic resin used is desirable various copolymers selected from vinylidene chloride, acrylonitrile, and acrylic ester, but not limited to these copolymers. The particle diameter of the synthetic resin hollow microsphere is desirably 20 to 150 $\mu$m. The specific gravity of the synthetic resin hollow microsphere is desirably about 0.01 to 0.04. Usually, aqueous dispersion of the synthetic resin hollow microspheres that contain some water (containing 70 to 90% by weight of water) is commercially available, and such synthetic resin hollow microspheres may be used.

The content of synthetic resin hollow microspheres is preferably 5 to 15% by weight (based on dry weight) to the total weight of the dough. If the content is less than 5% by weight (other components are contained much), then the dough is likely sticky and not sufficient in formability, and likely not sufficient in lightweight property of the dough; on the other hand, if the content is more than 15% by weight, then the modeled product is apt to be weak to the external force.

Because the synthetic resin hollow microspheres used in the present invention are lightweight, the volume in the dough of the present invention are very large, and the synthetic resin hollow microspheres occupy the majority of the dough volume. Furthermore, because the hollow microsphere is spherical, there are spaces among hollow microspheres, spaces accommodate water and other ingredients that form soft mixture so as to be movable during modeling and so as to make modeling or manuplating easy. Because only water the majority of which is in the space among hollow microspheres is evaporated during drying, the volume scarcely changes with concomitant change from wet state to dry state, and the modeled product is excellent in shape preservation.

Polyvinyl alcohol used in the present invention is partially hydrolized polyvinyl acetate, and the degree of hydrolysis is desirably 80 to 95 mol %, and more desirably 85 to 90 mol %. Polyvinyl alcohol in the form of powder or aqueous solution is used herein, and powder is usually used. Fine powder is desirably used so that powder does not coagulate each other when the powder is mixed with water.

Modified polyvinyl alcohol having a high viscosity of 400 to 900 mpa.s measured under conditions of 3% aqueous solution at 20° C. is used desirably as the polyvinyl alcohol used in the present invention.

Polyvinyl alcohol functions to bind hollow microspheres maintaining plasticity during modeling and to maintain the shape of the modeled product after modeling and drying.

The content of polyvinyl alcohol is preferably 5 to 10% by weight to the total dough (expressed in dry weight base), and more preferably 5 to 8% by weight. If the content of polyvinyl alcohol is less than 5% by weight, then the plasticity and ductility is likely not sufficient; on the other hand, if the content exceeds 10% by weight, then the dough is too hard, and the workability for modeling and hand feeling property become likely poor.

Examples of vinyl acetate resin used in the present invention include vinyl acetate based resins, such as polyvinyl acetate, modified polyvinyl acetate, ethylene-vinyl acetate copolymer, vinyl acetate-acrylic acid copolymer, vinyl acetate-acrylic ester copolymer, vinyl acetate-methacrylic acid copolymer, vinyl acetate-methacrylic ester copolymer, and vinyl acetate-acryl amide copolymer. Vinyl acetate resin is used in the form of powder or emulsion, and usually emulsion is used. An emulsion containing vinyl acetate resin component of 50% or more is desirably used.

Vinyl acetate resin having a viscosity of 1,000 to 150,000 mpa.s measured under conditions of 59% aqueous solution at 30° C. is preferable used in the present invention.

Vinyl acetate resin functions to bond hollow microspheres together with polyvinyl alcohol with maintaining plasticity during modeling, and functions to maintain the shapes of the modeled product after modeling and drying.

Vinyl acetate resin emulsion containing plasticizer is desirably used. Dibutyl phthalate or the like is exemplified as the plasticizer. The content of plasticizer is desirably 4 to 10% by weight to the emulsion weight.

The content of vinyl acetate resin is preferably 1.5 to 6% by weight (expressed in dry weight base), and more preferably 2 to 5% by weight.

The mixed use of polyvinyl alcohol and vinyl acetate resin is required to bond hollow microspheres with maintaining good softness during modeling and to maintain the shape of the modeled product after modeling and drying. Dough should be sufficiently plastic when it is wet so as to be modeled by hand of a child, and should be sufficiently ductile so as to be stretched to form thin or fine shape, and furthermore should be suitably hard (shape preservation) so as to maintain the modeled shape. The mixed use of polyvinyl alcohol and vinyl acetate resin satisfies these conditions. Furthermore, dried dough should not be cracked and should not be brittle, and should be resistant to deformation such as bending.

The mixing ratio of polyvinyl alcohol to vinyl acetate resin is desirably 10:7 to 10:3 by weight. If the mixing ratio of vinyl acetate resin exceeds 7, then dough is likely sticky and likely poor in formability, on the other hand if the mixing ratio is smaller than 3, then the breaking resistance to the external force is likely poor after drying.

Polyethylene oxide used in the present invention is a polymer obtained by ring-opening polymerization of ethyleneoxide, and is a water-soluble high polymer having ether groups in the middle part and hydroxyl groups at the ends. Polyethylene oxide having a molecular weight of approximately 300,000 to 1,200,000, more desirably 600,000 to 800,000 is used in the present invention. Such polyethylene oxide exhibits a very high viscosity even though it is a solution of a very low concentration, and the viscosity measured under conditions of 2.0% by weight solution at 25° C. is preferably 100 to 2000 mpa.s, more desirably 200 to 700 mpa.s (measured by means of a rotational viscometer). Polyethylene oxide having a melting point of 65 to 67° C. is desirable. Such polyethylene oxide is excellent in compatibility with synthetic resin hollow microspheres, polyvinyl alcohol, and vinyl acetate.

Powder or aqueous solution of polyethylene oxide is used, and usually polyethylene oxide powder is used. Polyethylene oxide fine powder is desirably used so as not to coagulate each other when it is mixed with water.

Polyethylene oxide functions to improve the plasticity and ductility of dough when it is modeled, and to improve the stickiness of the dough to thereby reduce sticking to hand, and the forming workability is improved. Surface smoothness of the modeled product are more improved by adding polyethylene oxide.

The content of polyethylene oxide is preferably 0.5 to 1.5% by weight to the total dough (expressed by dry weight base).

Dough of the present invention may be mixed with fiber powder in addition to the above-mentioned substances.

Fiber powder functions to improve the shape preservation after modeling and drying, and to exhibit the shrinkage prevention effect. Pulp powder, polyvinyl alcohol based fiber powder, cotton powder, and crashed sheet pulp are exemplified as the above-mentioned fiber powder. The natural or synthetic fiber powder having a length of 0.05 to 5.5 mm, more desirably 1 to 3 mm is used. The content of the fiber powder is preferably 0.5 to 4% by weight to the total dough weight.

Dispersant may be added to dough of the present invention in addition to the above-mentioned components. Higher alcohol sulfuric ester, polyoxyethylene laurylether sulfate sodium salt, and high polymer polycarboxylic acid are exemplified as the above-mentioned dispersant. Polyoxyethylene laurylether sulfate sodium salt is particularly desirable. The content of dispersant is preferably 2 to 8% by weight (% by weight of 25% aqueous solution) to the total dough weight.

Other than the above-mentioned components, carboxy methyl cellulose, methyl cellulose, hydroxy methyl cellulose, hydroxy ethyl cellulose, natural high polymer guargum, guargum derivatives may be added to the dough of the present invention. These substances function to improve the ductility, surface smoothness, and hand feeling of dough, the content of these substances is preferably 0.5 to 1.5% by weight to the total dough weight.

Humidifier may be added to dough of the present invention in addition to the above-mentioned components. Liquid paraffin, sorbitol, polyethylene glycol, polypropylene glycol or the like are exemplified as the humidifier. The content of humidifier is preferably 0.5 to 1.5% by weight to the total dough weight.

Furthermore, the content of water is preferably 50 to 80% by weight to the total dough weight, and more preferably 60 to 75% by weight.

Because dough of the present invention contains lightweight hollow microspheres as the major component in volume, dough of the present invention is so lightweight, children can lift it easily during modeling and carry it easily, and the modeled product can be carried easily.

Dough of the present invention contains hollow microspheres as the major component in volume that is fine and is soft, hand feeling of the dough is comfortable for a worker, dough is suitably soft for deforming it easily to form a desired shape by force of hand during modeling, dough is suitably hard for maintaining the modeled shape during modeling and excellent in shape preservation, and thus the dough is excellent in formability.

Furthermore, dough of the present invention will not stick to the hand of a worker during modeling, and will not stain the hand and clothes of a worker because of the good releasability, the comfortable modeling work is realized.

Dough of the present invention provides a modeled product obtained by modeling and drying that is resistant to bending deformation, and thus it is suitable for long time preservation.

The present invention will be described with reference to examples and comparative examples hereinafter; however, the present invention is by no means limited to these examples.

Various properties of obtained lightweight dough was evaluated by means of methods described herein under.

(1) Bending resistance test

A flat plate specimen of 30 mm×120 mm×2 mm (thickness) is prepared by use of modeling lightweight dough.

A test specimen is dried at a temperature of 50±2° C. for 24 hr in a dryer, cooled to a room temperature in the desiccator in a room maintained at 20±2° C., and taken out. An acrylic resin plate having a size 60 mm×60 mm×2 mm (thickness) is placed on the specimen at the portion from the edge of the specimen to 60 mm depart from the edge so as to cover a half of the specimen (the edge of the acrylic resin plate is coincident with the edge of the specimen), the portion of the specimen where the acrylic resin plate does not cover (length of 60 mm) is lifted to be bent along the border line between the portion where the acrylic resin plate covers and the portion where the acrylic resin plate does not cover, and the bending angle is measured when the specimen is cracked or broken. The test is carried out three times, and the average is calculated.

(2) Properties of dough (stickiness to hand, ductility of dough, surface smoothness, and hardness during modeling)

Ten panelists form molded products by use of test dough and evaluate sensorily. The rating is based on the number of panelists who evaluate a dough to be good.

8 to 10 panelists evaluate it to be good ⊚

6 to 7 panelists evaluate it to be good ○

3 to 5 panelist evaluate it to be good △

0 to 2 panelist evaluate it to be good ×

EXAMPLE 1

70 g of methylmethacrylate-acrylonitrile copolymer resin hollow microspheres dispersion (product of Matsumoto Yushi Co., Ltd., Matsumoto-Microsphere F-50E, average particle diameter of 20 to 80 μm, solid content of 15 to 20% by weight, water content of 80 to 85% by weight), 10 g of polyvinyl alcohol powder, 1 g of polyethylene oxide powder, and 4 g of fiber powder were kneaded in a keader. 10 g of vinyl acetate resin emulsion (product of Showa Highpolymer Co., Ltd., Polysol S-6, solid content of 59±2% by weight, plasticizer content of 4 to 10% by weight), 3 g of Monogen 170 (product of Dai-ichi Kogyo Seiyaku Co., Ltd., higher alcohol sulfuric ester), and 2 g of water were added to the kneaded product and further kneaded to prepare 100 g of modeling lightweight dough.

The obtained bending resistance test result is listed in Table 1. As shown in Table 1, neither breaking nor cracking occurred even at the bending angle of 180 degrees.

The obtained dough did not stick to hand, is not sticky, and excellent in ductility, surface smoothness, shape preservation of the dough, hand feeling, and workability. Eight to ten panelists out of ten panelists evaluated this dough to be good.

TABLE 1

|  | Bending resistance (bending angle and result) | *1 | *2 | *3 | *4 |
|---|---|---|---|---|---|
| E1 | 180°, neither breaking nor cracking | ⊚ | ⊚ | ⊚ | ⊚ |
| E2 | 180°, neither breaking nor cracking | ⊚ | ⊚ | ⊚ | ○ |
| CE1 | 180°, neither breaking nor cracking | △ | ○ | △ | ○ |
| CE2 | 80°, breaking | ⊚ | ○ | △ | △ |
| CE3 | — | × | × | × | × |
| CE4 | 90°, breaking | ⊚ | ⊚ | ○ | ○ |

*1: Sticking to hand
*2: Ductility
*3: Surface smoothness
*4: Shape preservation
Note:
E = Example,
CE = Comparative Example

EXAMPLE 2

67 g of acrylonitrile-vinylidene chloride copolymer resin hollow microspheres dispersion (product of Matsumoto Yushi Co., Ltd., Matsumoto Microsphere F-30E, average particle diameter of 20 to 120 μm, solid content of 10 to 15% by weight, water content of 85 to 90% by weight), 13 g of polyvinyl alcohol powder, and 1 g of polyethylene oxide powder were kneaded in a kneader. 10 g of vinyl acetate resin aqueous emulsion (product of Showa Highpolymer Co., Ltd., Polysol S-6), 5 g of Monogen 170 (product of Dai-ichi Kogyo Seiyaku Co., Ltd.), and 1 g of water were added to the kneaded product, and further kneaded to prepare 100 g of bending modeling lightweight dough.

The obtained bending resistance test result is listed in Table 1. As shown in Table 1, neither breaking nor cracking occurred even at the bending angle of 180 degrees.

The obtained dough did not stick to hand, is not sticky, and excellent in ductility, surface smoothness, shape preservation of the dough, hand feeling, and workability. Eight to ten panelists out of ten panelists evaluated this dough to be good.

Comparative Example 1

70 g of methylmethacrylate-acrylonitrile copolymer resin hollow microspheres dispersion (product of Matsumoto Yushi Co., Ltd., Matsumoto Microsphere F-50E, average particle diameter of 20 to 80 μm, solid content of 15 to 20% by weight, water content of 80 to 85% by weight), 16 g of polyvinyl alcohol, and 1 g of polyethylene oxide were kneaded in a kneader. 3 g of Monogen 170 (product of Dai-ichi Kogyo Seiyaku Co., Ltd.) and 6 g of water were added to the kneaded product, and further kneaded to prepare 100 g of modeling lightweight dough.

The obtained lightweight dough contains no vinyl acetate resin aqueous emulsion. The dough was subjected to the bending resistance test in the same manner as used in Example 1 to obtain the test result listed in Table 1. The specimen was broken at the bending angle of 80 degrees.

From the bending resistance test result, it is obvious that the dough containing no vinyl acetate resin aqueous emulsion is weak in bending resistance in comparison with the dough containing vinyl acetate aqueous emulsion. Replacement of vinyl acetate resin aqueous emulsion with polyvinyl alcohol, under the consideration that the vinyl acetate resin aqueous emulsion is a binder of the dough, likely results in high hardness of the dough and rough surface.

Comparative Example 2

70 g of methylmethacrylate-acrylonitrile copolymer resin hollow microspheres dispersion (product of Matsumoto Yushi Co., Ltd., Matsumoto Microsphere F-50E, average particle diameter of 20 to 80 μm, solid content 15 to 20% by weight, water content of 80 to 85% by weight), 1 g of polyethylene oxide, and 4 g of fiber powder were kneaded in a kneader. 20 g of vinyl acetate resin aqueous emulsion (solid content of 60±3% by weight, plasticizer content of 4 to 10% by weight), 3 g of Monogen 170 (product of Dai-ichi Seiyaku Kogyo Co., Ltd.), and 2 g of water were added to the kneaded product, and further kneaded to prepare 100 g of high bending strength lightweight dough (kneading time was 30 minutes, 40 minutes, and 50 minutes).

The obtained lightweight dough contains no polyvinyl alcohol. The dough was too sticky to use for modeling a craft, and it was difficult to make a specimen to be used for bending resistance test.

What is claimed is:

1. Modeling lightweight dough comprising synthetic resin hollow microspheres having a particle diameter of 20 to 120 μm, polyvinyl alcohol, vinyl acetate resin, polyethylene oxide, and water.

2. Modeling lightweight dough comprising synthetic resin hollow microspheres having a particle diameter of 20 to 120 μm, polyvinyl alcohol, vinyl acetate resin containing plasticizer, polyethylene oxide, and water.

3. Modeling lightweight dough comprising 5 to 15% by weight of synthetic resin hollow microspheres having a particle diameter of 20 to 120 μm, 5 to 10% by weight of polyvinyl alcohol, 1.5 to 6% by weight of vinyl acetate resin containing plasticizer, 0.5 to 1.5% by weight of polyethylene oxide, and 50 to 80% by weight of water.

4. Modeling lightweight dough comprising a mixture of an aqueous dispersion containing synthetic resin hollow microspheres having a particle diameter of 20 to 120 μm, polyvinyl alcohol, vinyl acetate resin aqueous emulsion, polyethylene oxide, and water.

5. The modeling lightweight dough of claim 1, wherein the polyethylene oxide has a molecular weight of 600,000 to 800,000.

6. The modeling lightweight of claim 1, further comprising a fiber of 0.5 to 4% by weight to the total dough weight.

7. The modeling lightweight dough of claim 1, further comprising a dispersant of 2 to 8% by weight to the total dough weight.

8. The modeling lightweight dough of claim 1, further comprising a humidifier.

9. The modeling lightweight dough of claim 8, wherein the humidifier is selected from the group consisting of liquid paraffin, sorbitol, polyethylene glycol, and polypropylene glycol.

10. The modeling lightweight dough of claim 8, wherein the humidifier comprises 0.5 to 1.5% by weight to the total dough weight.

11. The modeling lightweight dough of claim 1, further containing one or more substances selected from the group consisting of carboxyl methyl cellulose, methyl cellulose, hydroxy methyl cellulose, hydroxy ethyl cellulose, and a natural high polymer guargum.

12. The modeling lightweight dough of claim 11, wherein said one or more substances is present in the amount of 0.5 to 1.5% by weight to the total dough weight.

* * * * *